United States Patent
Moon et al.

(10) Patent No.: US 6,320,714 B1
(45) Date of Patent: Nov. 20, 2001

(54) REDUCED HEAD POPULATION DETECTION IN A DISC DRIVE

(75) Inventors: John E. Moon, Oklahoma City; Timothy T. Walker; Paul F. Kusbel, both of Edmond; Robert Matousek, Oklahoma City, all of OK (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/352,450

(22) Filed: Jul. 13, 1999

Related U.S. Application Data

(63) Continuation-in-part of application No. 09/271,541, filed on Mar. 18, 1999.
(60) Provisional application No. 60/092,667, filed on Jul. 13, 1998.

(51) Int. Cl.[7] ........................................... G11B 5/02
(52) U.S. Cl. .................. 360/67; 360/46; 360/69; 360/55; 324/212
(58) Field of Search ................ 360/67, 46, 69, 360/55, 132, 68; 324/210, 212

(56) References Cited

U.S. PATENT DOCUMENTS

| | | |
|---|---|---|
| 4,799,112 | 1/1989 | Bremmer et al. . |
| 5,087,884 * | 2/1992 | Brannon ................................ 324/523 |
| 5,262,907 | 11/1993 | Duffy et al. . |
| 5,276,558 | 1/1994 | Hanson . |
| 5,276,662 | 1/1994 | Shaver, Jr. et al. . |
| 5,375,243 | 12/1994 | Parzych et al. . |
| 5,465,240 | 11/1995 | Mankovitz . |
| 5,550,502 | 8/1996 | Aranovsky . |
| 5,572,659 | 11/1996 | Iwasa et al. . |
| 5,608,910 | 3/1997 | Shimakura . |
| 5,631,999 | 5/1997 | Dinsmore . |
| 5,710,675 * | 1/1998 | Goldstone et al. .................... 360/69 |
| 5,726,821 * | 3/1998 | Cloke et al. ............................ 360/67 |
| 5,732,237 | 3/1998 | Ikeda . |
| 5,751,672 | 5/1998 | Yankowski . |
| 5,854,554 * | 12/1998 | Tomita et al. ....................... 324/210 |
| 5,986,842 * | 11/1999 | Matsumoto et al. .................. 360/69 |
| 6,057,981 * | 5/2000 | Fish et al. ......................... 360/97.01 |

* cited by examiner

*Primary Examiner*—David Hudspeth
*Assistant Examiner*—Dan I. Davidson
(74) *Attorney, Agent, or Firm*—Crowe & Dunlevy

(57) ABSTRACT

An apparatus and method for determining the configuration of a disc drive head-disc assembly (HDA). The HDA includes an array of rotatable discs and an actuator adjacent the discs, with the actuator supporting a maximum number of heads in a fully populated configuration and a reduced number of heads in a depopulated configuration. Each head is disposed at a unique head position. A servo circuit determines an impedance of a selected head position having a head when the disc drive is fully populated but not when the disc drive is depopulated. The servo circuit identifies this configuration of the HDA in relation to the determined impedance, and initializes the drive accordingly.

16 Claims, 6 Drawing Sheets

REDUCED HEAD POPULATION DETECTION IN A DISC DRIVE

RELATED APPLICATIONS

This application is a continuation-in-part of copending U.S. patent application Ser. No. 09/271,541 filed Mar. 18, 1999, and claims the benefit of United States Provisional Application No. 60/092,667 entitled A METHOD TO DETERMINE IF AN HDA IS A DE-POP PRIOR TO SPIN-UP, filed Jul. 13, 1998.

FIELD OF THE INVENTION

The present invention relates generally to the field of disc drive devices and more particularly, but without limitation, to improving the operational performance of a disc drive by identifying the configuration of the head-disc assembly (HDA) of the disc drive.

BACKGROUND OF THE INVENTION

Disc drives are used as primary data storage devices in modern computers and computer networks. A typical disc drive includes a head-disc assembly (HDA) housing one or more magnetic discs which are rotated by a spindle motor at a constant high speed and accessed by an array of read/write heads which store data on tracks defined on the disc surfaces. Electronics used to control the operation of the HDA are provided on a printed wiring assembly (also referred to as a "circuit board" or "card") which is mounted to the underside of the HDA to complete the disc drive.

To meet the tremendous technical and logistical challenges of remaining competitive in the present market, disc drive manufacturers have taken steps to design and release new disc drive products as fast and efficiently as possible. Of particular interest is component standardization, which involves the standardization of disc drive designs so that a wide variety of disc drive products from a single product family can be provided with the same or similar hardware components. The performance of each individual drive is then optimized during manufacturing through the selection of parameter values (such as write current, gain, filter characteristics, etc.) which are subsequently loaded and used by the drive during, operation.

As modern disc drives typically employ firmware to provide programming for disc drive controllers (such as microprocessors and digital signal processors), manufacturers further commonly load substantially the same firmware on all of the drives in the same disc drive product family. The firmware relies upon additionally stored information indicative of the particular configuration of the drive (such as the number of discs, the data storage capacity, the type of interface, etc.) to access particular routines suitable for each particular disc drive configuration, and loads the parameters established during manufacturing to optimize the performance of the drive.

A typical disc drive includes one or more non-volatile memory devices (i.e., memory devices that retain their contents when external power is removed from the drive) to which the firmware is written. The parameter values and product information are also written to such devices during the manufacture of the drive. The devices are located on the disc drive printed wiring assembly (PWA) and are accessed during each initialization of the drive.

A problem can thus arise when an originally installed PWA is removed from a disc drive and replaced with a new, replacement PWA. Such replacements commonly occur during manufacturing and field service operations in response to, for example, the detection of a failure condition associated with the originally installed PWA. Unless steps are explicitly taken to ensure that the parameter values and product information associated with the HDA are transferred from the originally installed PWA to the new, replacement PWA, an error condition may result when the disc drive is reinitialized using the new PWA. Particularly, the firmware stored on the new PWA may expect to see a different hardware configuration than that which the HDA actually possesses, or the parameter values stored on the new PWA may be inappropriate for reliable operation of the drive. Moreover, during manufacturing, a disc drive can often spin up with a default code before the new or unique code may be downloaded.

Such mismatches in parameters and product information can result in unacceptable delays as a disc drive with a newly installed replacement PWA attempts to reinitialize. Moreover, when such mismatches in parameters and product information are sufficiently pronounced, the disc drive can be physically damaged when the drive attempts to spin-up and load the heads (i.e. operationally move the heads out over the disc surfaces). Although the optimal parameter values for an HDA are also typically stored on designated tracks of the HDA, such tracks cannot be accessed until after the disc drive has already successfully spun-up and loaded the heads.

Even when no replacement of the PWA occurs, problems can still arise when new, updated firmware is downloaded to the PWA, if the new firmware is incorrectly suited to the configuration of the HDA. Such firmware updates are often performed during field service operations, and although precautions are taken to ensure the correct firmware is downloaded, errors still occasionally occur. As will be recognized, a firmware-hardware mismatch can also result in the same types of problems that occur when an incorrectly configured PWA is installed.

For example, during spin-up, the firmware may not be capable of determining the configuration of a particular HDA if the number of heads and discs in a disc drive differ depending upon the drive. In an effort to reduce costs, many manufacturers may create disc drives utilizing a reduced number of heads and discs. For example, disc drives may comprise five heads for three discs (commonly referred to as a depopulated configuration) as opposed to ten heads for five discs (commonly referred to as a fully populated configuration). In both configurations, the same hardware including an actuator with six arms extending therefrom may be used such that no additional costs are accrued during manufacturing a depopulated configuration of a disc drive. The balance and inertial characteristics of a depopulated actuator can be maintained by the use of dummy heads suspended from the actuator, through the use of swage plates with extra mass to compensate for the missing flexures and heads, and other suitable approaches.

Although cost is significantly reduced, a problem arises when firmware is not capable of adapting to the depopulated configuration of the disc drive during initialization of the drive. Therefore, when the firmware of the PWA sends incorrect initialization information, disc drive fault or even damage to the HDA may result.

Accordingly, there is a need for a way to readily indicate the configuration of the HDA of a disc drive to eliminate problems when a new, replacement PWA is installed in the drive, or when new firmware is downloaded to the PWA.

SUMMARY OF THE INVENTION

The present invention is directed toward an apparatus and method for determining the configuration of a disc drive head-disc assembly (HDA).

In accordance with a preferred embodiment, the HDA includes an array of rotatable discs and an actuator adjacent the discs. The actuator supports a maximum number of heads in a fully populated configuration and a reduced number of heads in a depopulated configuration. Each head is disposed at a unique head position.

A servo circuit operably coupled to the actuator preferably comprises a processor having associated programming to allow a preamplifier circuit to select a head position having a head if the configuration of the disc drive is fully populated and not having a head if the configuration of the disc drive is depopulated. Preferably, prior to spin-up of the heads, the preamplifier circuit determines an impedance at a selected head position having a head if the disc drive is fully populated and not having a head if the disc drive is depopulated. The preamplifier circuit then compares the value of the impedance to a predetermined threshold value to determine whether the selected head position has a head, and therefore whether the disc drive is fully populated or depopulated. The disc drive is therefore prepared for initialization prior to spin-up.

These and various features as well as advantages which characterize the present invention will be apparent from a reading of the following detailed description and a review of the associated drawings.

BRIEF DESCRIPTION OF THE DRAWINGS

FIG. 8 is a flow chart illustrating the general steps performed in accordance with a DE-POP DETECTION ROUTINE, for which associated programming is stored in the flash memory device of FIG. 2 and utilized by the control processor of FIG. 2 in accordance with an alternative preferred embodiment of the present invention.

DETAILED DESCRIPTION

Figure 1:
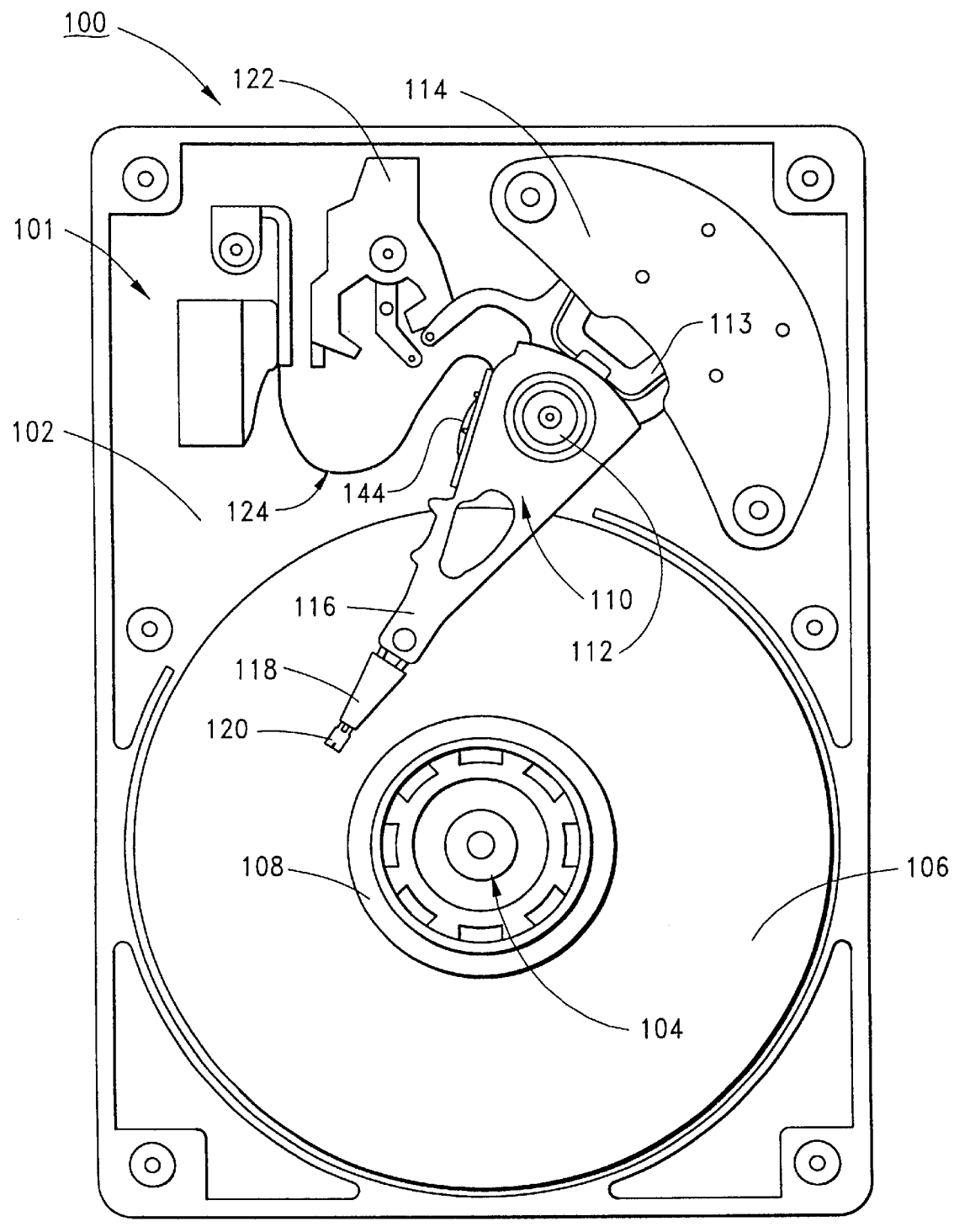
FIG. 1 provides a top plan view of a disc drive constructed in accordance with a preferred embodiment of the present invention.

Referring now to FIG. 1, shown therein is a top plan view of a disc drive 100 constructed in accordance with a preferred embodiment of the present invention.

The disc drive 100 includes a head-disc assembly (HDA) 101 and a disc drive printed wiring assembly (PWA) which is mounted to the underside of the HDA 101 and thus, not visible in FIG. 1. The PWA provides circuitry necessary to control the operation of the HDA 101 and to transfer data between the HDA 101 and a host computer in which the disc drive 100 can be mounted in a user environment.

With reference to FIG. 1, the HDA 101 includes a base deck 102 to which various disc drive components are mounted. A top cover, which has been omitted from FIG. 1 to facilitate the present discussion, cooperates with the base deck 102 to form an internal, sealed environment for the disc drive 100. A spindle motor 104 is provided to rotate a stack of discs 106 at a constant high speed, with a disc clamp 108 securing the discs 106 to the spindle motor 104.

To access the discs 106, a controllably positionable actuator assembly 110 is provided which rotates about a cartridge bearing assembly 112 in response to currents applied to a coil (a portion of which is shown at 113) of a voice coil motor (VCM) 114. The actuator assembly 110 includes a plurality of arms from which corresponding flexure assemblies extend, the topmost of which are identified at 116 and 118, respectively. Heads 120 are provided at distal ends of the flexure assemblies 116, 118 and are supported over the discs 106 by air bearings established by air currents set up by the rotation of the discs 106.

A latch assembly 122 is provided to secure the heads 120 over landing zones (not designated) at the innermost diameters of the discs 106 when the disc drive 100 is deactivated. A flex circuit assembly 124 provides electrical communication paths between the actuator assembly 110 and the disc drive PWA.

Figure 2:
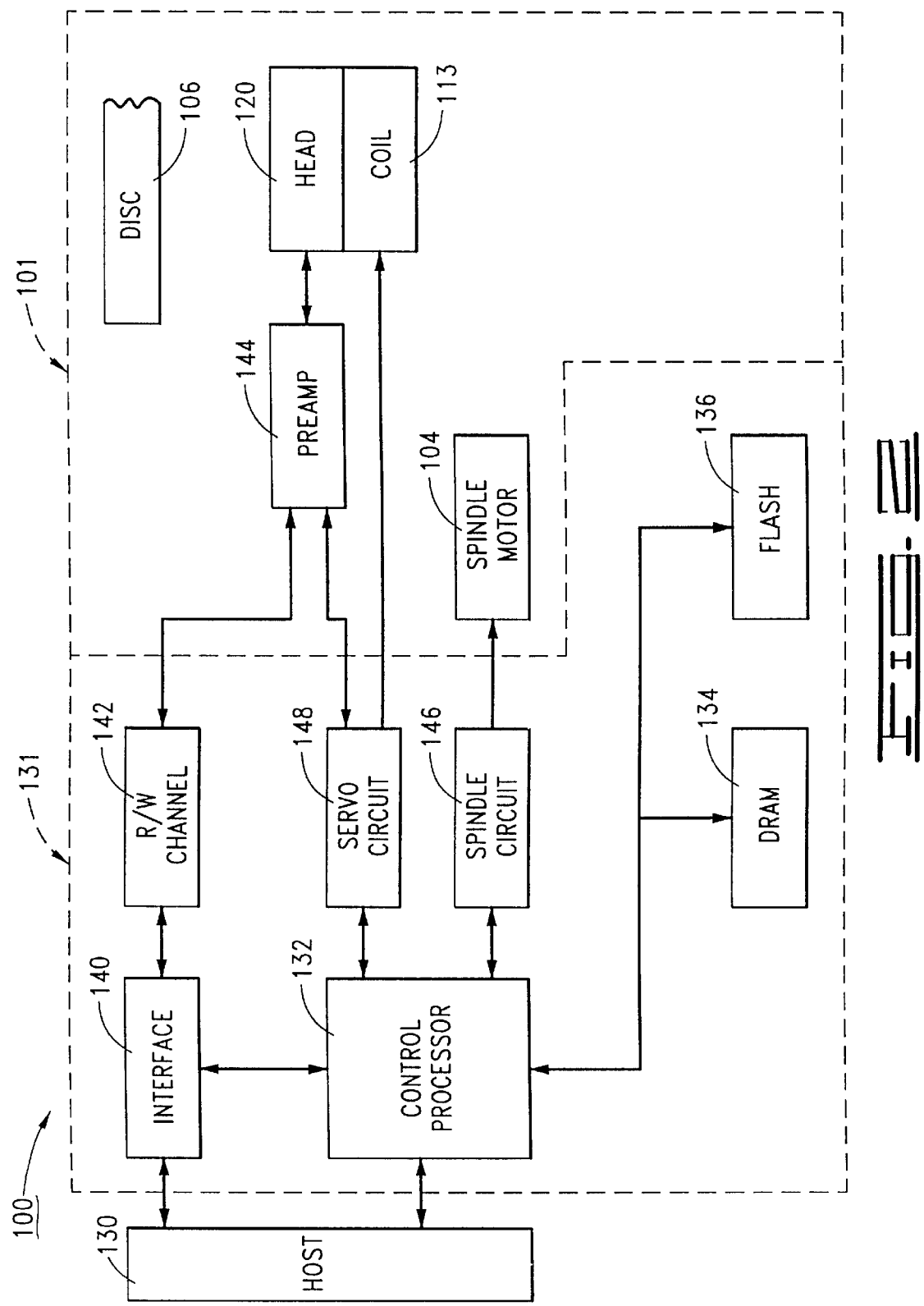
FIG. 2 is a functional block diagram of the disc drive of FIG. 1

Referring now to FIG. 2, shown therein is a functional block diagram of the disc drive 100 of FIG. 1, in conjunction with a host computer 130 in which the disc drive 100 is contemplated as being mounted. More particularly, FIG. 1 shows circuitry of the PWA (denoted by dotted line enclosure 131) and selected components of the HDA 101. The host computer 130 provides top level control of a disc drive control processor 132, which in turn controls the operation of the disc drive 100 in accordance with programming and parameter values stored in dynamic random access memory (DRAM) 134 and non-volatile flash memory 136.

Data to be stored by the disc drive 100 are transferred from the host computer 130 to an interface circuit 140, which includes a data buffer for temporarily buffering the data and a sequencer for directing the operation of a read/write channel 142 and a preamp/driver circuit 144 ("preamp") during data transfer operations. The preamp 144 is preferably mounted to the actuator assembly 110, as shown in FIG. 1.

Additionally, as is known in the art a spindle circuit 146 is provided to control the rotation of the disc 106 through back electromotive force (bemf) commutation of the spindle motor 104 (FIG. 1). A servo circuit 148 is provided to control the position of the head 120 relative to the disc 106 as part of a servo loop established by the head 120, the preamp 144, the servo circuit 148 and the coil 113. The servo circuit 148 includes a digital signal processor (DSP) and associated memory (not separately shown), and the control processor communicates with and controls the operation of the DSP in a manner such as generally set forth by U.S. Pat. No. 5,262.907 issued Nov. 16, 1993 to Duffy et al., assigned to the assignee of the present invention.

Figure 3:
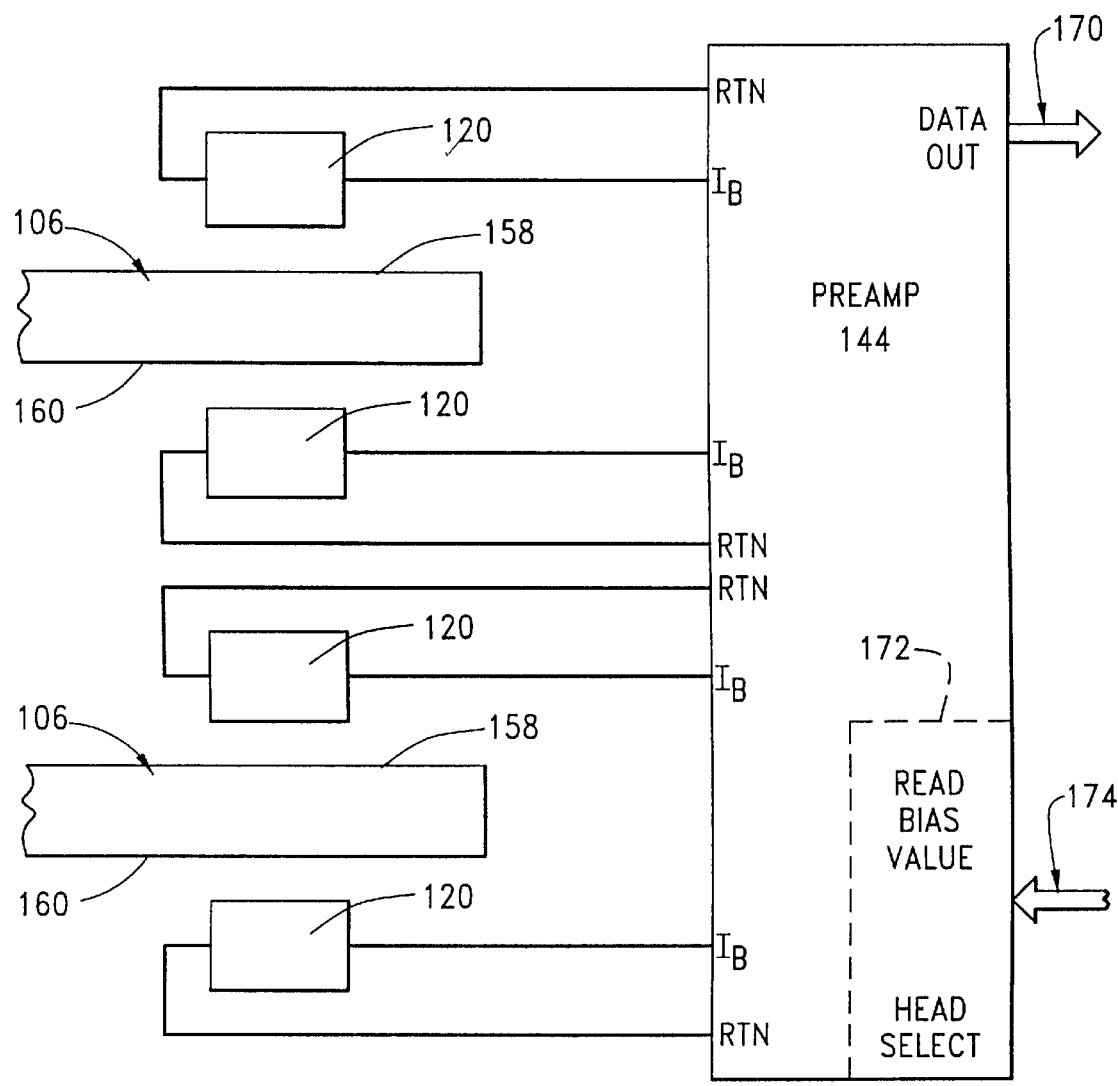
FIG. 3 is a functional block diagram of the preamp shown in FIG. 2, in conjunction with a plurality of heads and discs of the disc drive.

FIG. 3 provides a functional block diagram of the preamp 144 of FIG. 2, in conjunction with a pair of discs 106 and associated heads 120. It will be readily understood, however, that although two discs 106 have been shown for purposes of the present discussion, the present invention is not so limited. Each of the heads 120 is supported adjacent recording surfaces 158, 160, of the discs 106.

Figure 4:
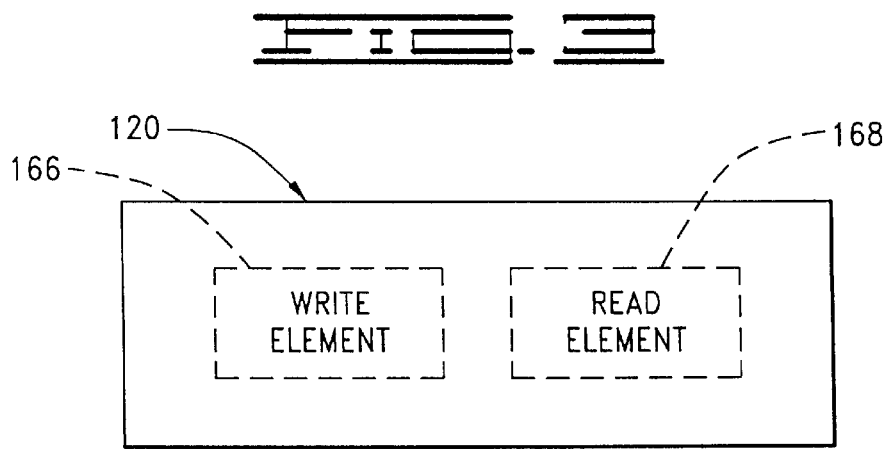
FIG. 4 shows the general construction of the head of FIG. 2.

The heads 120 are preferably characterized as magnetoresistive (MR) heads, with each head including a conventional thin film write element and MR read element, as generally represented in FIG. 4 at 166, 168 respectively for one of the heads 120. Each MR read element 168 of the disc drive 100 preferably comprises an alloy formed from cobalt, nickel and iron and possesses an electrical resistance that varies when subjected to a magnetic field of a selected orientation. To attain sensitivities necessary to support data densities of modern disc drives, each MR read element 168 includes relatively thin boundary layers (typically measured in Angstroms) which are relatively delicate and sensitive to damage. It is thus desirable to hold the common mode potential of all of the MR read elements 168 of each of the heads 120 very closely to that of the discs 106 in order to prevent head-disc electrical discharges (arcing), and to ensure that currents applied to the MR read elements 168 do not exceed the current carrying capabilities of the elements.

Returning again to FIG. 3, as explained more fully below the preamp 144 is used during read and write operations of the disc drive 100 to access data stored on the recording surfaces 158, 160. In doing so, the preamp 144 selectively applies current to the write and read elements 166, 168 of the heads 120. The preamp 144 preferably incorporates a variety of additional features such as threshold detection, high frequency signal filtering and head selection capabilities as are generally known in the art.

Of particular interest to the present discussion is the operation of the preamp 144 during a read operation, during which a read bias current of selected magnitude is continuously applied to the MR read element 168 of the selected head 120. It should be noted that either constant current, constant voltage, or constant power methods may be used for biasing the element 168. Data stored on the associated recording surfaces 158, 160 are detected in relation to changes in voltage across the MR read element 168 and reflected in a readback signal output by the preamp 144 to the read/write channel 142 (FIG. 2). In FIG. 3, the readback signal is shown to be transmitted along a DATA OUT path 170, which preferably comprises a pair of signal lines connected to a pair of differential output pins of the preamp 144 (not separately designated).

The magnitudes of the read bias currents (each identified generally as "$I_B$" in FIG. 3) are individually selected for each of the heads 120 during disc drive manufacturing. More particularly, the read bias currents $I_B$ are preferably selected so as to optimize disc drive performance by, for example, writing a selected amount of test data to each of the recording surfaces 158, 160, reading back the data a number of times using read bias currents $I_B$ of various magnitudes, and selecting the final magnitudes for the read bias currents $I_B$ in relation to those magnitudes that provide the best read error rates (or other evaluation criteria).

The magnitudes of the read bias currents $I_B$ are controlled in response to read bias values that are stored in flash memory 136 and sent by the control processor 132 (FIG. 2) to the preamp 144 by way of the DSP of the servo circuit 148. The read bias values are expressed in a multi-bit, digital form and loaded to a selected address of a register (represented by dotted block 172) of the preamp 144 by way of a serial interface path 174. In similar fashion, the various heads 120 are individually selected in response to a multi-bit, digital head select value which is loaded into another address of the register 172 by way of the serial interface path 174. It will be understood that the serial interface path 174 preferably includes a data line along which the read bias and head select values are transmitted, as well as a clock line for supplying a clock to control the reading and writing of the register 172 and an enable line to enable register access. The preamp 144 is contemplated as accommodating up to 10 different heads 120 and facilitating up to 32 different read bias current levels. Each update of the read bias value or the head select value occurs through the sequential clocking of the bits of a 16 bit word having one read/write command bit, seven address bits and eight data bits. The register 172 is thus updated with a new word upon receipt of the $16^{th}$ clock pulse.

During normal disc drive operation, one of the heads 120 will be in a selected state (referred to herein as a "presently selected head" or "present head"). The preamp 144 will generally operate to continuously apply the appropriate read bias current to the presently selected head 120. For example, during a write mode of operation during which the presently selected head 120 is used to write data to a selected track on the associated recording surface 158, 160, the data are written through the selective application of write currents by the preamp 144 to the write element (such as 166 of FIG. 4) of the presently selected head. However, the presently selected head 120 also periodically reads data (such as servo or header information) from the associated recording surface during the write operation to enable the servo circuit 148 to control the position of the presently selected head 120, necessitating the continued application of the read bias current to the MR read element 168.

Likewise., the preamp 144 continuously applies the read bias current to the presently selected head 120 during each read operation in order to retrieve the data from the associated recording surface. The actual reading and writing of data occurs while the selected track is followed by the presently selected head 120, although seeks from one track to the next can also be periodically performed, as a number of different tracks (and even from different recording surfaces 158, 160) can be accessed during a particular read or write operation. After the conclusion of each read and write operation, the servo circuit 148 (FIG. 2) generally operates to cause the presently selected head 120 to continue following the last accessed track, until the next command is executed by the disc drive 100.

It will be recognized that the heads 120 selected at any given time and the magnitude of the read bias current applied thereto are determined by the head select and read bias values stored in the register 172. Each of the MR read elements 168 of the heads 120 are nominally identical and so will have an impedance within a specified range. When an impedance of a read element exceeds a predetermined threshold, the register 172 has the further capability of reporting an "open reader fault" for the selected head 120. In other words, if no head is installed, or a dummy head exists, then an "open reader fault" or an "open writer fault" is reported.

Figure 5:
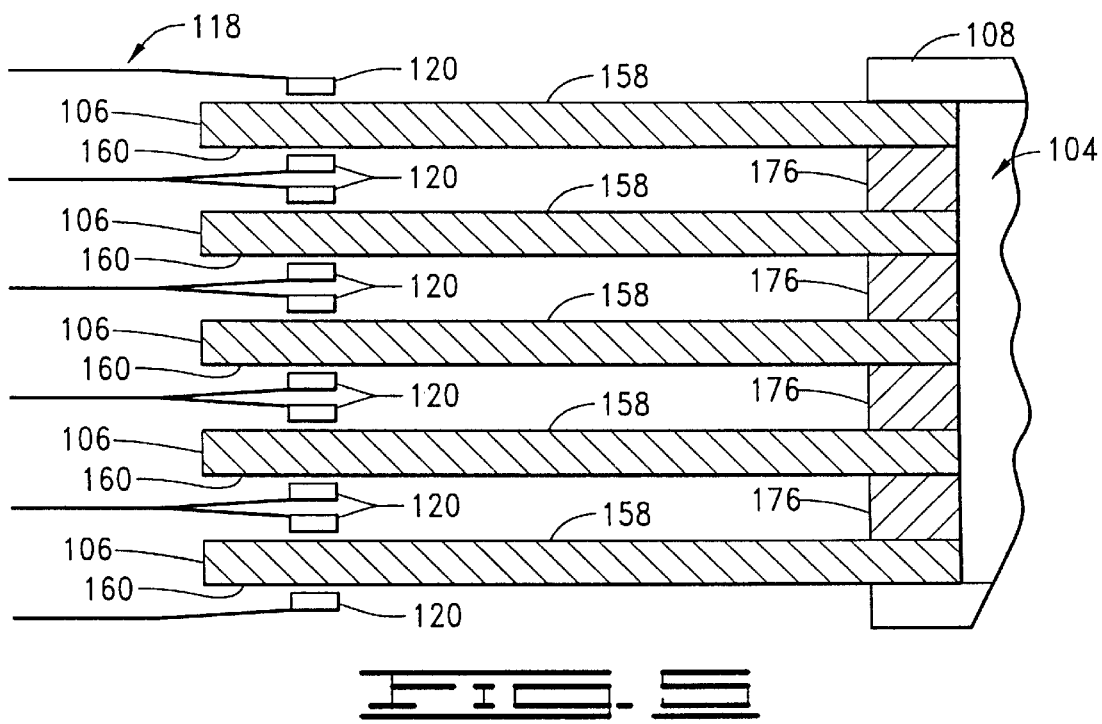
FIG. 5 provides a partial cross-sectional, elevational view of the HDA of FIG. 1 in a fully populated configuration.
Figure 6:
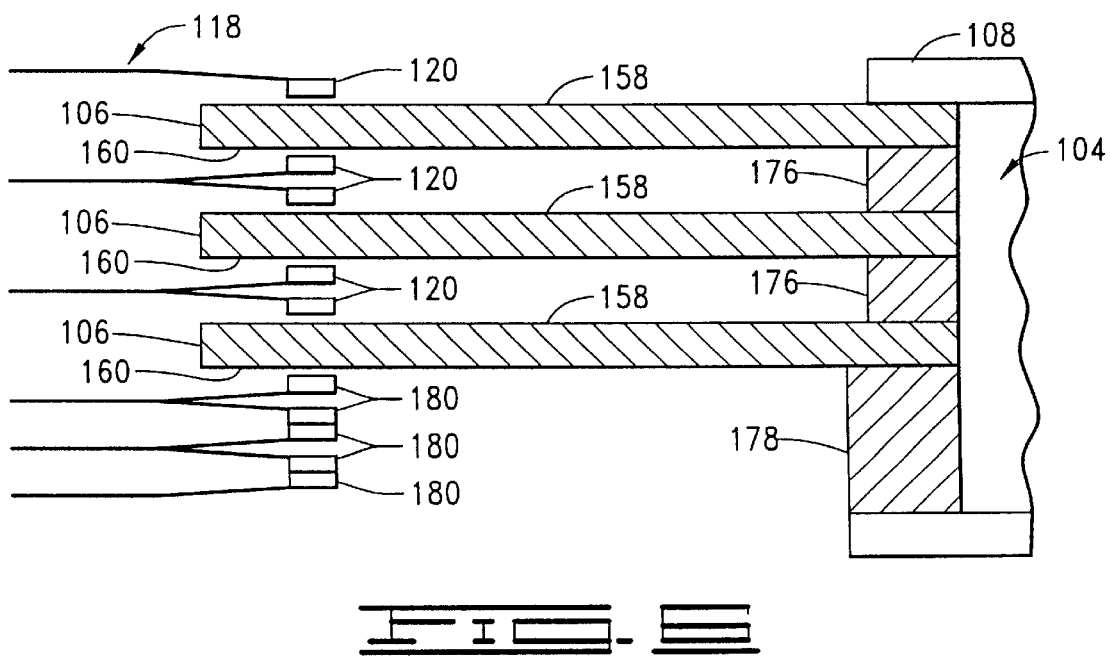
FIG. 6 provides a partial cross sectional, elevational view of the HDA of FIG. 1 in a depopulated configuration.

As previously discussed, disc drives (such as 100) can be provided with a full complement of heads and discs (referred to as a fully populated configuration) or a reduced such complement (referred to as a depopulated configuration) as a less expensive alternative. In a fully populated configuration, each surface of a disc has a corresponding head, whereas in a depopulated configuration, there are a reduced amount of discs and heads such that all of the surfaces of the discs do not have a corresponding functional head. FIGS. 5 and 6 provide illustrative examples of each of these configurations.

Turning first to FIG. 5, shown therein is a partial cross-sectional, elevational view of the HDA 101 of FIG. 1 in a fully populated configuration wherein the disc drive 100 has five discs 106 and ten heads 120 corresponding with each of the surfaces 158, 160. The heads 120 are suspended such that the data on each of the surfaces 158, 160 of the discs 106 may be accessed by the preamp 144. The discs 106 are secured to the spindle motor 104 between a plurality of equally sized spacers 176 to allow rotation of the discs 106 without harmful contact between the recording surface 160 of one disc 106 and the recording surface 158 of an adjacent disc 106. It should be noted that the fully populated configuration shown in FIG. 5 has been disclosed for purposes of illustration and is not limiting; that is, various other numbers of discs and heads can readily be used in the practice of the present invention.

Referring now to FIG. 6, shown therein is a partial cross-sectional, elevational view of the HDA 101 of FIG. 1 in a depopulated configuration having three discs 106 and five functional heads 120. In the depopulated configuration, each of the recording surfaces 158, 160 of the discs 106 do not have a corresponding functional head 120 and a reduced number of discs 106 are secured to the spindle motor 104. It should be noted that the depopulated configuration shown in FIG. 6 has also been disclosed for purposes of illustration and is not limiting; that is, various other ratios of discs to heads can readily be used in the practice of the present invention.

As shown in FIG. 6, the reduced number of discs 106 are secured to the spindle motor 104 between a plurality of equally sized spacers 176 to allow rotation of the discs 106 without harmful contact between the recording surface 160 of one disc 106 and the recording surface 158 of an adjacent disc 106. It should be noted that a large filler spacer 178 may be used to compensate for an area of the spindle motor 104 not occupied by discs 106 that would normally be present in a fully populated configuration. This allows use of the same spindle motor 104 for both the fully populated and depopulated configurations.

The heads 120 are suspended adjacent the surfaces 158, 160 of each of the discs 106 with the exception of the bottom most disc 106 wherein a functional head 120 does not suspend adjacent the recording surface 160. Instead, a plurality of non-operable heads 180 (also referred to as "dummy heads") suspended by flexure assemblies 118 are provided below the bottom most disc 106, the dummy heads 180 having substantially the same mass as the functional heads 120. The dummy heads 180 are provided to maintain the inertial balance characteristics of the disc drive 100, thereby compensating for the absence of the functional heads 120 which would be present in a fully populated configuration of the disc drive 100. In a preferred embodiment, the dummy heads 180 will be pressed together by spring forces of the flexure assembly 118 as shown in FIG. 6. The dummy heads 180 are heads which are electrically inert wherein no current path exists.

Figure 7:
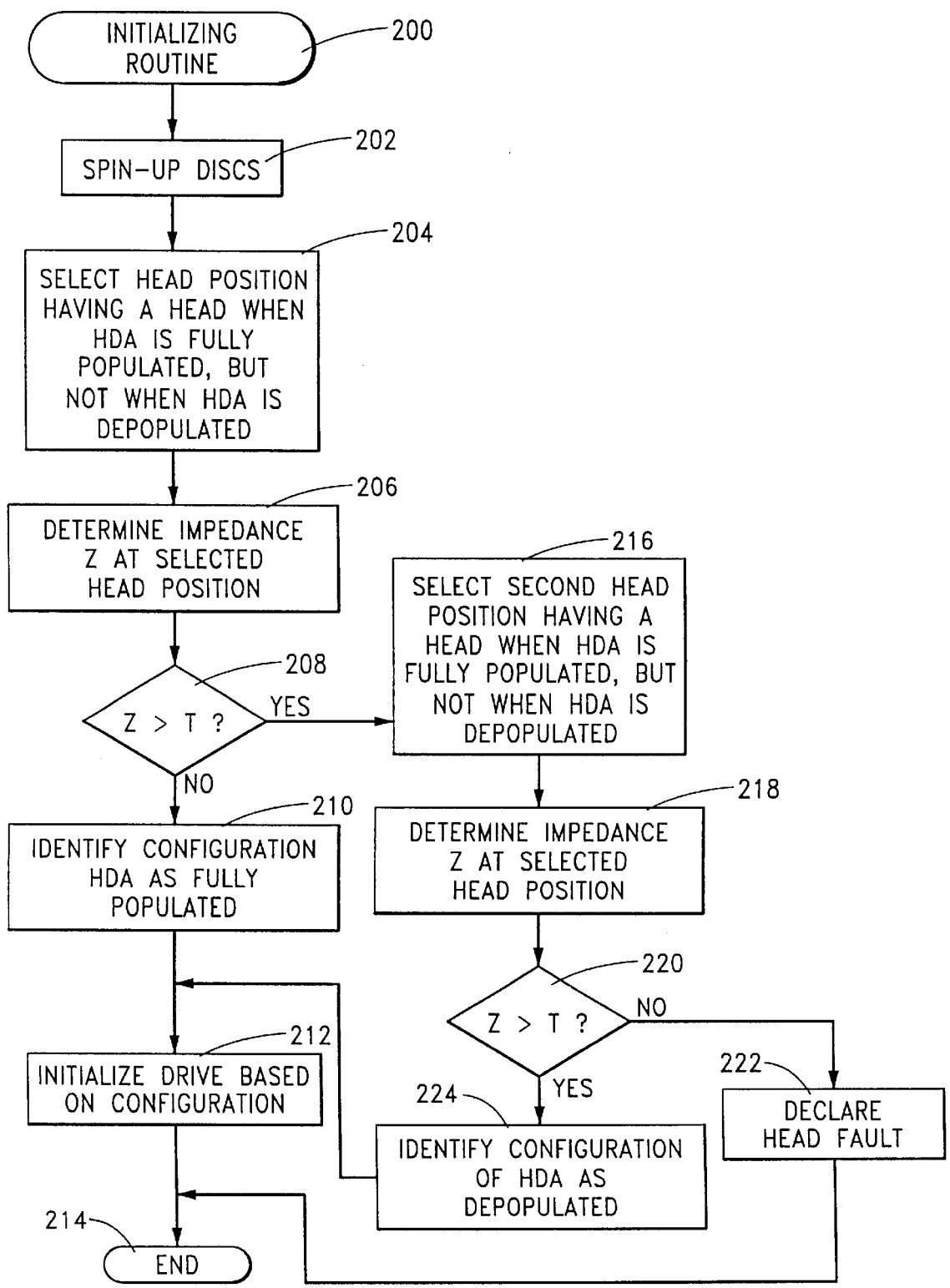
FIG. 7 is a flow chart illustrating the general steps performed in accordance with an INITIALIZING ROUTINE, for which associated programming is stored in the flash memory device of FIG. 2 and utilized by the control processor of FIG. 2 in accordance with a preferred embodiment of the present invention.
Figure 6:
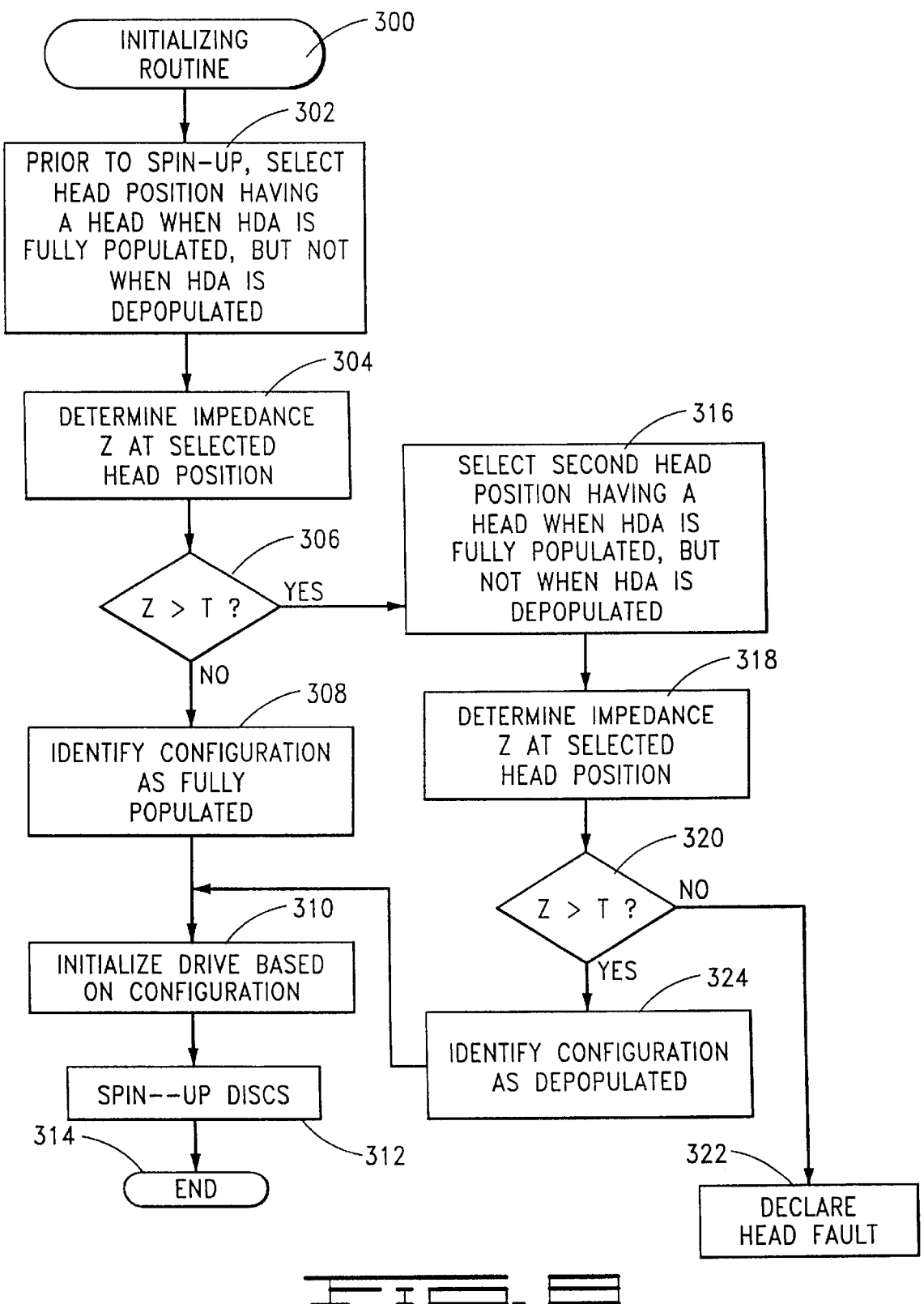

It will be understood, that in a preferred embodiment, the measured impedance of selected heads is used to detect the particular configuration of the disc drive 100 and to proceed with proper initialization thereof. To this end, FIG. 7 has been provided which sets forth a generalized flow chart for an INITIALIZING ROUTINE 200, contemplated as representative of programming stored in flash memory 136 and utilized by the control processor 132 during initialization of the disc drive 100 such as, for example, when the disc drive 100 is turned on after being in a non-operational state.

As shown in block 202, the control processor 132 first operates to direct the spindle circuit 146 to initiate rotation of the discs 106 up to operational speed (also known as spin-up). After successful spin-up is accomplished, the register 172 uses the multi-bit, digital head select value loaded by means of the serial interface path 174 to select a head position that would have a head 120 when the disc drive 100 is fully populated but would not have a head 120 when the disc drive 100 is depopulated, as indicated in block 204. In block 206, the preamp 144 applies current to the head 120 of the selected head position and senses a resulting voltage induced across the selected head position to determine the impedance Z at that selected head position and in block 208, compares that impedance to a threshold value T that is greater than the impedance expected if a head 120 were present. If a functional head 120 is present, the impedance will be less than the threshold value, and continuing to block 210, the servo circuit 148 identifies the disc drive 100 as fully populated. The flow then proceeds to block 212 where the disc drive 100 initializes the drive based on the fully populated configuration, at the conclusion of which the routine ends at block 214 and the disc drive 100 notifies the host computer 130 (FIG. 2) that the drive is ready for normal operation.

However, if the impedance exceeds the predetermined threshold value, then the register 172 will provide an "open reader fault" which likely indicates that the high impedance reading means that no head is present at the selected head position. There is a possibility, though, that the high impedance is a result of a defective head. To determine whether the high impedance value is a result of the absence of a functional head 120 or the presence of a defective head at the selected head position, the routine selects a second head position that would have a head 120 when the disc drive 100 is fully populated but would not have a head 120 when the disc drive 100 is depopulated, as indicated in block 216. It should be noted, however, that if the disc drive 100 contains only two heads, detecting the impedance of one head 120 is sufficient for depop detection. The preamp 144 then applies current to the head 120 of the second selected head position and senses a resulting voltage induced across the second selected head position. In block 218, the preamp 144 uses the applied current and the sensed voltage to determine the impedance at that second selected head position and in block 220, compares that impedance to a threshold value that is greater than the impedance expected if a head 120 were present. If the impedance is less than the threshold value, then a head 120 is known to be present at that second head position. As indicated in block 222, the register 172 declares an error condition indicating a head fault, also known as an "open reader fault" as described above. In other words, since the second head position that should have a head in a fully populated configuration does indeed have a functional head 120, the "open reader fault" for the first selected head position in block 204 indicates a defective head in the first selected head position rather than an absence of a head as would be expected in a depopulated configuration. The routine then ends at block 214 and the disc drive 100 notifies the host computer 130 (FIG. 2) that the drive has a defective head. It should also be noted that the routine may be repeated to check the impedance of all the heads in a disc drive as opposed to merely two heads.

If, however, during the comparing block 220, the impedance is greater than the threshold value, then as indicated in block 224, the servo circuit 148 confirms the configuration as being depopulated. The flow then proceeds to block 212 where the disc drive 100 initializes the drive based on the depopulated configuration, at the conclusion of which the INITIALIZING ROUTINE ends at block 214 and the disc drive 100 notifies the host computer 130 (FIG. 2) that the drive is ready for normal operation.

In a second preferred embodiment of the present invention, the measured impedance of the heads 120 is used to detect the particular configuration of the disc drive 100 prior to spin-up of the discs 106. Utilizing the read element 168 of a head 120 to measure impedance requires loading the heads 120 since the read element 168 is in contact with the discs 106 prior to spin-up and loading. Therefore, applying a read bias current to the read element 168 prior to loading the heads 120 would severely damage the adjacent disc surface.

In the second preferred embodiment, detection of whether the disc drive 100 is fully populated or depopulated involves using the writer element 166 prior to spin-up of the discs 106. To this end, FIG. 8 has been provided which sets forth a generalized flow chart for a DE-POP DETECTION ROUTINE 300, contemplated as representative of programming stored in flash memory 136 and utilized by the control processor 132. To facilitate discussion, general references will be made back to FIGS. 2–4.

In particular, a conventional thin film write element 166 (FIG. 4) may be used to determine the configuration of the disc drive 100. Prior to spin up of the discs 106, referring back to FIG. 2, the control processor 132 commands the servo circuit 148 to select a head 120 that should be present in a fully populated disc drive 100 but not in a depopulated disc drive 100, as indicated in block 302. The control processor 132 then instructs the preamplifier circuit 144 to switch from the default read mode to write mode. In block 304, the servo circuit 148 then initializes the preamplifier circuit 144 with a predetermined amount of write current applied to the writer element 166 on the selected head 120 to determine the impedance Z at that selected head position, with the reader current deactivated. It should be noted that the same preamplifier circuit 144 is used for both a fully populated disc drive 100 and a de-populated disc drive 100. Therefore, the preamplifier circuit 144 is capable of accessing a disc drive with a full population of heads as well as a disc drive with a reduced population of heads.

Continuing with block 304, the control processor 132 instructs the servo circuit 148 to detect the resulting voltage induced across the selected head position to determine the impedance Z at that selected head position and in block 306, compares that impedance Z to a threshold value T that is greater than the impedance expected if a head 120 were present. If a functional head 120 is present, the impedance will be less than the threshold value T, and continuing to block 308, the servo circuit 148 identifies the disc drive 100 as fully populated. The flow then proceeds to block 310 where the disc drive 100 initializes the drive based on the fully populated configuration, and spins up the discs 106 at block 312. The routine then ends at block 314 and the disc drive 100 notifies the host computer 120 (FIG. 2) that the drive is ready for normal operation.

However, if the impedance exceeds the predetermined threshold value, then the register 172 (FIG. 3) will provide an "open writer fault" which likely indicates that the high impedance reading means that no head is present at the selected head position. In particular, register 172 will detect an impedance that is relatively high if no head exists where a head would exist if the disc drive is fully populated. The impedance is the total opposition offered by a circuit or device to the flow of alternating current, as denoted below:

$$Z = (R^2 + X^2)^{1/2} \tag{1.1}$$

where Z is impedance,
R is resistance,
X is reactance.

Therefore, if a closed-loop circuit does not exist as in the absence of a functional head, then the resistance will be infinite, resulting in an infinite value for the impedance Z.

There is a possibility, however, that the high impedance is a result of a defective head. To determine whether the high impedance is a result of the absence of a functional head 120 or the presence of a defective head at the selected head position, the routine selects a second head position that would have a head 120 when the disc drive 100 is fully populated but would not have a head when the disc drive 100 is depopulated, as indicated in block 316. The preamp 144 then applies current to the write element 166 of the head 120 of the second selected head position and senses a resulting voltage induced across the second selected head position. In block 318, the preamp 144 uses the applied current and the sensed voltage to determine the impedance at that selected head position and in block 320, compares that impedance to a threshold value that is greater than the impedance expected if a head 120 were present. If the impedance is less than the threshold value, then a head 120 is known to be present at that second selected head position. As indicated in block 322, the register 172 declares an error condition indicating a head fault, also known as an "open writer fault" as described above. In other words, since the second head position that should have a head in a fully populated configuration does indeed have a functional head 120, the "open writer fault" for the first selected head position in block 302 indicates a defective head in the first selected head position rather than an absence of a head as would be expected in a depopulated configuration. The routine then ends at block 314 and the disc drive 100 notifies the host computer 130 (FIG. 2) that the disc drive has a defective head.

If, however, during the comparing block 320, the impedance is greater than the threshold value, then as indicated in block 324, the servo circuit 148 confirms the configuration as depopulated. The flow then proceeds to block 310 where tile disc drive 100 initializes the disc drive 100 based on the depopulated configuration 312. The DE-POP DETECTION ROUTINE then ends at 314 and the disc drive 100 is ready for operation.

Although preferred embodiments of the present invention utilize the "open reader fault" and "open writer fault" reporting capability of the register 172 to determine the configuration of the disc drive 100, it should not be read as limiting; that is, various other methodologies may be applicable for measuring an impedance of a read element or a write element to determine whether a head is present at a selected head position to identify the configuration of the disc drive. Further, it will be noted that the methodology discussed above can also be advantageously implemented during servo track writing during disc drive manufacturing.

It will now be clear that the present invention provides significant advantages in that the disc drive 100 has the capability of determining the configuration of the associated HDA and proceed with initialization accordingly. The PWAs 131 can thus be readily swapped during manufacturing or in the field without risking disc drive fault or damage to the HDA.

In view of the foregoing, it will be understood that the present invention is directed to an apparatus and method for detecting reduced head population in a disc drive 100. As exemplified by a preferred embodiment, a disc drive 100 comprises a PWA 131 housing control circuitry for the disc drive 100. A head-disc assembly, HDA 101, is operably coupled to the printed wiring assembly and includes a rotatable disc 106 to which data are written by a controllably positionable head 120 disposed at a unique head position. An actuator 110 adjacent the disc is operationally configured to support a maximum number of heads in a fully populated configuration and a reduced number of heads in a depopulated configuration.

A servo circuit 148 operably coupled to the actuator preferably comprises a processor having associated programming to allow a preamplifier circuit 144 to select a head position which would have a head if the configuration of the disc drive is fully populated and would not have a head when the disc drive is depopulated. The preamplifier circuit 144 further determines an impedance at that selected head position and compares the value of the impedance to a predetermined threshold value to determine whether the selected head position has a head. A register 172 of the preamplifier circuit 144 reports a fault when the impedance exceeds the predetermined threshold value, therefore indicating that either no head is present at the selected head position or only a defective head is present.

It will be further understood that various claim steps have been identified using numbering and lettering solely as an aid in readability and understanding, so that such identification will not limit the claims to the particular ordering of steps shown.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a disc drive head-disc assembly having an array of discs adjacent an actuator supporting a maximum number of heads in a fully populated configuration and a reduced number of heads in a depopulated configuration, each head disposed at a unique head position of the actuator, a method for determining the configuration of the head-disc assembly, comprising steps of:

(a) prior to spin-up of the discs, determining a first impedance of a first write element at a first selected head position having a head when the head-disc assembly is fully populated, but not when the head-disc assembly is depopulated;

(b) identifying the configuration of the head-disc assembly as fully populated when the first impedance is less than a predetermined threshold; and (c) identifying the configuration of the head-disc assembly as depopulated when the first impedance is greater than the predetermined threshold.

2. The method of claim 1, wherein the determining step (a) further comprises steps of:

(a1) applying current to the first write element at the first selected head position;

(a2) sensing voltage across the first write element; and (a3) determining the impedance in relation to a magnitude of the applied current and a magnitude of the sensed voltage.

3. The method of claim 1, wherein the head-disc assembly further comprises a preamplifier circuit having a status register which provides an error status when the first selected head position provides an impedance greater than the predetermined threshold, and wherein the determining step (a) further comprises a step of:

(a1) reading the status register.

4. The method of claim 1, wherein the identifying step (c) further comprises steps of:

(c1) determining a second impedance of a second write element at a second selected head position having a head when the head-disc assembly is fully populated, but not when the head-disc assembly is depopulated;

(c2) identifying the configuration of the head-disc assembly as depopulated when the second impedance is greater than the predetermined threshold; and (c3) declaring an error condition when the second impedance is less than the predetermined threshold.

5. The method of claim 1, further comprising a step of:

(d) initializing the disc drive in relation to whether the configuration of the head-disc assembly is identified as being fully populated or depopulated.

6. A disc drive comprising:

an array of rotatable discs;

an actuator, adjacent the discs, operationally configured to support a maximum number of heads in a fully populated configuration and a reduced number of heads in a depopulated configuration, wherein each head is disposed at a unique head position of the actuator; and a servo circuit, operably coupled to the actuator, comprising a processor having associated programming to:

(a) prior to spin-up of the discs, determine a first impedance of a write element at a first selected head position having a head when the disc drive is fully populated, but not when the disc drive is depopulated;

(b) identify the configuration of the drive as fully populated when the first impedance is less than a predetermined threshold;

(c) identify the configuration of the drive as depopulated when the first impedance is greater than the predetermined threshold; and (d) initialize the disc drive in relation to the identified configuration of the disc drive.

7. The disc drive of claim 6, wherein the disc drive further comprises a preamplifier operably coupled to the heads and the servo circuit, and wherein the preamplifier applies current to the write element at the selected head position, senses a voltage across the selected head position, and determines the impedance in relation to a magnitude of the applied current and a magnitude of the sensed voltage during the determining step (a).

8. The disc drive of claim 7, wherein the preamplifier comprises a status register which sets an error flag when the impedance exceeds a predetermined threshold.

9. The disc drive of claim 6, wherein the processor has additional programming to:

(c1) determine a second impedance of a second write element at a second selected head position having a head when the disc drive is fully populated, but not when the disc drive is depopulated;

(c2) identify the configuration of the drive as depopulated when the second impedance is greater than the predetermined threshold; and (c3) declare an error condition when the second impedance is less than the predetermined threshold.

10. In a disc drive head-disc assembly having an array of discs adjacent an actuator supporting a maximum number of heads in a fully populated configuration and a reduced number of heads in a depopulated configuration, each head disposed at a unique head position of the actuator, a method for determining the configuration of the head-disc assembly, comprising steps of:

(a) prior to spin-up of the discs, applying a current to a first write element at a first selected head position having a head when the head-disc assembly is fully populated, but not when the head-disc assembly is depopulated to sense the voltage across the selected head position;

(b) determining a first impedance at the first selected head position;

(c) identifying the configuration of the head-disc assembly as fully populated when the first impedance is less than a predetermined threshold; and (d) identifying the configuration of the head-disc assembly as depopulated when the first impedance is greater than the predetermined threshold.

11. The method of claim 10, wherein the determining step (b) further comprises steps of:

(b1) determining the first impedance in relation to a magnitude of the applied current and a magnitude of the sensed voltage.

12. The method of claim 11, wherein the head-disc assembly further comprises a preamplifier circuit having a status register which provides an open writer error status when the first selected head position provides a first impedance greater than the predetermined threshold, and wherein the determining step (b) further comprises a step of:

(b1) reading the status register.

13. The method of claim 10, wherein the identifying step (d) further comprises steps of:

(d1) applying a current to a second write element of a second selected head position having a head when the head-disc assembly is fully populated, but not when the head-disc assembly is depopulated to sense the voltage across the selected head position;

(d2) determining a second impedance of a second selected head position;

(d3) identifying the configuration of the head-disc assembly as depopulated when the second impedance is greater than the predetermined threshold; and (d4) declaring an error condition when the second impedance is less than the predetermined threshold.

14. The method of claim 10, further comprising a step of:

(e) initializing the disc drive in relation to whether the configuration of the head disc assembly is identified as being fully populated or depopulated.

15. The method of claim 14, further comprising a step of:

(f) accelerating the discs from a rest position to a selected rotational speed sufficient to support the heads over the discs.

16. A disc drive comprising:

an array of heads adjacent a corresponding array of discs; and means for detecting a total number of heads in the array of heads by applying a current to a write element of a selected head while the heads are in contact with the disc prior to spin-up.

* * * * *